US 11,242,052 B2

(12) United States Patent
Kaita et al.

(10) Patent No.: US 11,242,052 B2
(45) Date of Patent: Feb. 8, 2022

(54) OBJECT DETECTION SYSTEM FOR SADDLE-TYPE VEHICLE, AND SADDLE-TYPE VEHICLE

(71) Applicant: HONDA MOTOR CO., LTD., Tokyo (JP)

(72) Inventors: Kihoko Kaita, Wako (JP); Yoshiyuki Kuroba, Wako (JP); Hiroshi Maeda, Wako (JP); Masashi Hagimoto, Wako (JP)

(73) Assignee: HONDA MOTOR CO., LTD, Tokyo (JP)

(*) Notice: Subject to any disclaimer, the term of this patent is extended or adjusted under 35 U.S.C. 154(b) by 0 days.

(21) Appl. No.: 17/023,827

(22) Filed: Sep. 17, 2020

(65) Prior Publication Data
US 2021/0001845 A1    Jan. 7, 2021

Related U.S. Application Data

(63) Continuation of application No. PCT/JP2018/012882, filed on Mar. 28, 2018.

(51) Int. Cl.
*B60W 30/095* (2012.01)
*B62J 45/415* (2020.01)
(Continued)

(52) U.S. Cl.
CPC ........ *B60W 30/0956* (2013.01); *B60W 40/11* (2013.01); *B60W 40/112* (2013.01);
(Continued)

(58) Field of Classification Search
CPC ......... B60W 2300/36; B60W 2420/42; B60W 2420/52; B60W 2420/54; B60W 2510/20;
(Continued)

(56) References Cited

U.S. PATENT DOCUMENTS 7,451,994 B2 * 11/2008 Heitner .................... B62H 1/10
                                                  280/288.4
8,398,277 B2 *  3/2013 Fritz ....................... B60Q 1/12
                                                   362/464
(Continued)

FOREIGN PATENT DOCUMENTS

JP    H08-026157 A    1/1996
JP    H11-023291 A    1/1999
(Continued)

OTHER PUBLICATIONS

International Search Report for PCT/JP2018/012882 dated Jun. 19, 2018.
IPRP for PCT/JP2018/012882 dated Jan. 20, 2020.

*Primary Examiner* — Babar Sarwar
(74) *Attorney, Agent, or Firm* — Thomas Horstemeyer, LLP

(57) ABSTRACT

An object detection system for a saddle-type vehicle is provided. The system comprises an object detection unit configured to detect an object, wherein the object detection unit is provided on a handlebar which is rotatable to a body of the vehicle; an inclination detection unit configured to detect an inclination of a saddle-type vehicle; a steering angle detection unit configured to detect a steering angle of the handlebar to the body; and a position specification unit configure to specify a position of the object detected by the object detection unit, and correcting the position so that the inclination detected by the inclination detection unit is upright and the steering angle of the handlebar detected by the steering angle detection unit is directed straight.

7 Claims, 5 Drawing Sheets

(51) Int. Cl.
  *B62J 45/422* (2020.01)
  *B60W 40/11* (2012.01)
  *B60W 40/112* (2012.01)
  *B60W 40/114* (2012.01)
  *B62J 27/00* (2020.01)
  *G06K 9/00* (2006.01)

(52) U.S. Cl.
  CPC ............ *B60W 40/114* (2013.01); *B62J 27/00* (2013.01); *B62J 45/415* (2020.02); *B62J 45/422* (2020.02); *G06K 9/00791* (2013.01); *B60W 2300/36* (2013.01); *B60W 2420/42* (2013.01); *B60W 2420/52* (2013.01); *B60W 2420/54* (2013.01); *B60W 2510/20* (2013.01); *B60W 2520/14* (2013.01); *B60W 2520/16* (2013.01); *B60W 2520/18* (2013.01); *B60W 2554/00* (2020.02)

(58) Field of Classification Search
  CPC ......... B60W 2520/14; B60W 2520/16; B60W 2520/18; B60W 2554/00; B60W 30/0956; B60W 40/11; B60W 40/112; B60W 40/114; B62J 27/00; B62J 45/20; B62J 45/41; B62J 45/415; B62J 45/422; G01S 13/931; G01S 7/4026; G06K 2209/21; G06K 9/00791
  See application file for complete search history.

(56) References Cited

U.S. PATENT DOCUMENTS

| | | | | |
|---|---|---|---|---|
| 8,849,474 | B2 * | 9/2014 | Yoneta | B62J 27/00 701/1 |
| 9,153,133 | B1 * | 10/2015 | Lunsford | G01S 13/931 |
| 9,199,687 | B2 * | 12/2015 | Takatsuka | G01P 3/488 |
| 10,421,464 | B2 * | 9/2019 | Heckmann | B60W 40/09 |
| 10,429,501 | B2 * | 10/2019 | Pineda-Deom | B60W 40/112 |
| 10,430,670 | B2 * | 10/2019 | Torii | G06T 3/60 |
| 10,562,582 | B2 * | 2/2020 | Mizuno | B62K 23/02 |
| 2007/0102217 | A1 * | 5/2007 | Kimura | B62K 21/005 180/223 |
| 2009/0005943 | A1 * | 1/2009 | Oshima | F02D 11/105 701/62 |
| 2009/0222164 | A1 * | 9/2009 | Seiniger | B60T 8/172 701/36 |
| 2010/0168958 | A1 * | 7/2010 | Baino | B60Q 1/12 701/36 |
| 2012/0259479 | A1 * | 10/2012 | Yoneta | B62H 7/00 701/1 |
| 2013/0311075 | A1 * | 11/2013 | Tran | G08G 1/166 701/117 |
| 2014/0372074 | A1 * | 12/2014 | Dribinsky | G01C 9/06 702/154 |
| 2017/0154224 | A1 * | 6/2017 | Torii | G06K 9/3208 |
| 2017/0176591 | A1 * | 6/2017 | Pineda-Deom | B60W 40/112 |
| 2017/0327177 | A1 * | 11/2017 | Mizuno | H04N 5/2254 |
| 2019/0126810 | A1 * | 5/2019 | Heimrath | G01S 17/931 |

FOREIGN PATENT DOCUMENTS

| | | |
|---|---|---|
| JP | 2013060128 A | 4/2013 |
| JP | 2016139389 A | 8/2016 |
| JP | 2016172489 A | 9/2016 |
| JP | 2017171223 A | 9/2017 |
| JP | 2017202809 A | 11/2017 |
| WO | 2015174208 A1 | 11/2015 |
| WO | 2019186799 A1 | 10/2019 |

* cited by examiner

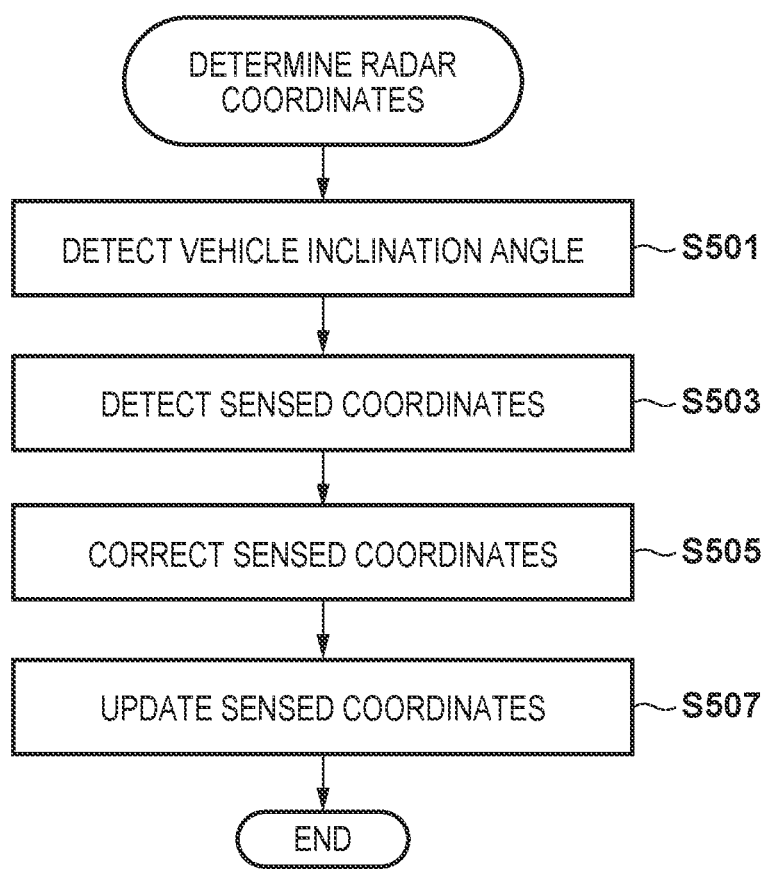

OBJECT DETECTION SYSTEM FOR SADDLE-TYPE VEHICLE, AND SADDLE-TYPE VEHICLE

CROSS-REFERENCE TO RELATED APPLICATION

This application is a continuation of International Patent Application No. PCT/JP2018/012882 filed on Mar. 28, 2018, the entire disclosures of which is incorporated herein by reference.

TECHNICAL FIELD

The present invention relates to an object detection system for a saddle-type vehicle having a forward detection function, and a saddle-type vehicle equipped with the same.

BACKGROUND ART

An adaptive cruise control (ACC) function (hereinafter referred to as a preceding vehicle tracking function or simply a tracking function), which is the function of detecting a vehicle traveling forward, using a radar or the like, and follows the vehicle, has been developed and has begun to be mounted on four-wheeled vehicles. The ACC requires a sensor such as a radar for detecting the preceding vehicle. Here, a saddle-type vehicle such as a two-wheeled vehicle has a characteristic that the vehicle body thereof, for example, when turning, is inclined toward the center of turning (hereinafter, such inclination is referred to as leaning or rolling), unlike a four-wheeled vehicle. In addition, compared to a four-wheeled vehicle, a saddle-type vehicle has a shorter wheel base and is more inclined in a front-rear direction at braking or starting (hereinafter, such inclination is referred to as pitching). Therefore, a sensor such as a radar is also inclined when the vehicle body is inclined due to rolling or pitching, and the position of the detected object, especially the preceding vehicle, may be displaced from the position detected when the vehicle stands upright, and the tracking function may be canceled. PTL1 proposes that an attachment module be used to rotate an image capturing system in the direction opposite to the direction in which the vehicle body is inclined.

CITATION LIST

Patent Literature

PTL1: Japanese Patent Laid-Open No. 2017-171223
However, since PTL1 employs an attachment module, which is a complex mechanism, the system is costly. Also, such a mechanism is likely to be a cause of failure or the like due to the complexity thereof. Furthermore, the image capturing system is rotated about only one axis, namely the rolling axis.

SUMMARY OF THE INVENTION

The present invention has been made in view of the above-described conventional example, and aims to provide an object detection system for a saddle-type vehicle and a saddle-type vehicle that are capable of correcting an inclination, using a simple configuration.

According to one aspect of the present invention, the present invention is an object detection system for a saddle-type vehicle, comprising: an object detection unit configured to detect an object, wherein the object detection unit is provided on a handlebar which is rotatable to a body of the vehicle; an inclination detection unit configured to detect an inclination of a saddle-type vehicle; a steering angle detection unit configured to detect a steering angle of the handlebar to the body; and a position specification unit configured to specify a position of the object detected by the object detection unit, and correcting the position so that the inclination detected by the inclination detection unit is upright and the steering angle of the handlebar detected by the steering angle detection unit is directed straight.

According to the present invention, it is possible to provide an object detection system for a saddle-type vehicle and a saddle-type vehicle that are capable of correcting an inclination, using a simple configuration.

BRIEF DESCRIPTION OF THE DRAWINGS

FIG. 5 is a flowchart showing a procedure for correcting the detected position.

DESCRIPTION OF THE EMBODIMENTS

The following describes a saddle-type vehicle according to an embodiment of the present invention with reference to the drawings. In the description, a direction in the travel direction of the saddle-type vehicle is referred to as a front-rear direction, a left-right direction when a driver rides the vehicle is referred to as a vehicle width direction (or a left-right direction) of the saddle-type vehicle, and the right and the left seen from the driver are respectively referred to as a right direction and a left direction.

Saddle-Type Vehicle

Figure 1:
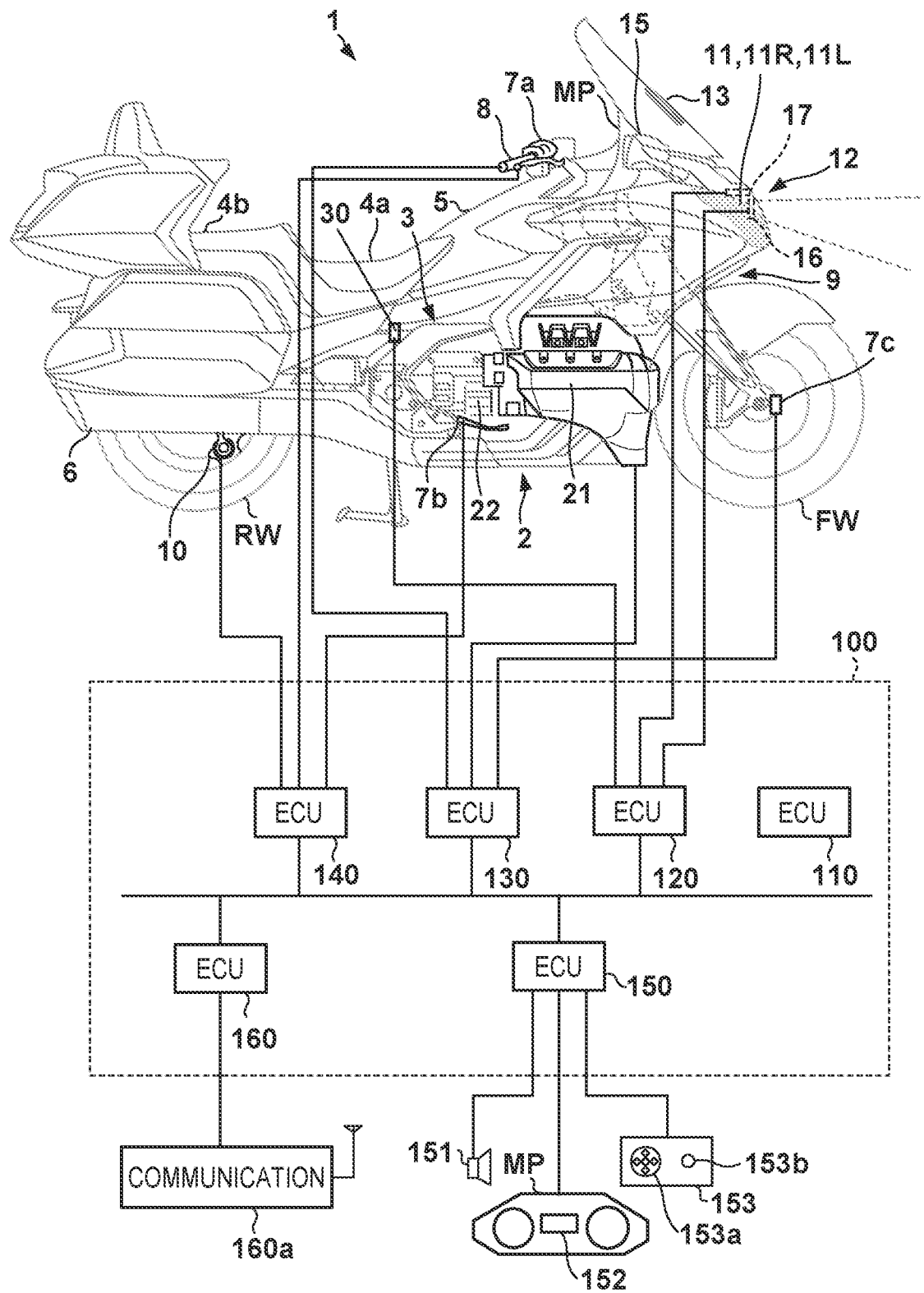
FIG. 1 is a diagram showing a right side surface and a control block of a saddle-type vehicle according to an embodiment of the present invention.

FIG. 1 is a diagram showing a right side surface and components such as ECUs (Electronic Control Units) for controlling various units, of a saddle-type vehicle 1 according to an embodiment of the present invention.

The saddle-type vehicle 1 is a two-wheeled touring motorcycle that is suitable for long-distance travel. However, the present invention is applicable to various kinds of saddle-type vehicles including two-wheeled motorcycles in other forms. In addition, the present invention is applicable to not only vehicles that use an internal combustion engine as a drive source, but also electric vehicles that use a motor as a drive source. Hereinafter, the saddle-type vehicle 1 may also be referred to as a vehicle 1.

The vehicle 1 is provided with a power unit 2 between a front wheel FW and a rear wheel RW. In the present embodiment, the power unit 2 includes a horizontally opposed six-cylinder engine 21 and a transmission 22. A driving force from the transmission 22 is transmitted to the rear wheel RW via a drive shaft (not shown), and rotates the rear wheel RW.

The power unit 2 is supported by vehicle body frames 3. The vehicle body frames 3 include a pair of left and right main frames that are provided so as to extend in an X direction. A fuel tank 5 and an air cleaner box (not shown)

are provided above the main frames. A meter panel MP that displays various kinds of information for a rider is provided forward of the fuel tank 5.

Ahead pipe that rotatably supports a steering axis (not shown) that is rotated by handlebars 8 is provided at front side end portions of the main frames. A pair of left and right pivot plates are provided at rear end portions of the main frames. Lower end portions of the pivot plates and front end portions of the main frames are connected by a pair of left and right lower arms (not shown), and the power unit 2 is supported by the main frames and the lower arms. A pair of left and right seat rails that extend rearward are also provided at the rear end portions of the main frames, and the seat rails support a seat 4a on which a rider can sit, a seat 4b on which a passenger can sit, a rear trunk, and so on. Rear end portions of the seat rails and the pivot plates are connected by a pair of left and right sub frames.

Front end portions of a rear swing arm (not shown) that extends in the front-rear direction are swingably supported by the pivot plates. The rear swing arm is swingable in a top-bottom direction, and the rear wheel RW is supported by a rear end portion thereof. An exhaust muffler 6 that muffles noise of an exhaust gas from the engine 21 is provided on a side of a lower portion of the rear wheel RW. Left and right saddle bags are provided on the sides of an upper portion of the rear wheel RW.

A front suspension mechanism 9 that supports the front wheel FW is formed at the front end portions of the main frames. The front suspension mechanism 9 includes an upper link, a lower link, a fork support member, a cushion unit, and a pair of left and right front forks.

Front Structure

A headlight unit 11 that emits light forward of the vehicle 1 is provided on a front portion of the vehicle 1. The headlight unit 11 in the present embodiment is a double-eye type headlight unit that includes a right light emitter 11R and a left light emitter 11L that are symmetrical. However, a single-eye type or triple-eye type headlight unit, or an asymmetrical double-eye type headlight unit may also be adopted. In addition, a multiple-eye type headlight unit that includes an even larger number of light emitters may also be adopted.

The front portion of the vehicle 1 is covered by a front cover 12, and a front side portions of the vehicle 1 are covered by a pair of left and right side covers. A screen 13 is provided above the front cover 12. The screen 13 is a windshield that reduces the wind pressure received by the rider during travel, and is made of, for example, a transparent resin member. A pair of left and right side mirror units 15 are provided on the sides of the front cover 12. The side mirror units 15 support side mirrors (not shown) with which the rider can visually check rearward.

Detection units 16 and 17 that detect what is in front of the vehicle 1 is provided rearward of the front cover 12. In this example, the detection units 16 and 17 are provided at fixed positions relative to the main frames. In the present embodiment, the detection unit 16 is a radar (for example, a millimeter wave radar). However, another type of sensor that can detect forward through the front cover 12, such as a sonar that performs ultrasonic distance measurement, or a lidar that performs image detection and distance measurement using laser light may be employed. When the detection unit 16 detects an obstacle that is located forward of the vehicle 1, the meter panel MP may display a warning to alert the rider, for example. The detection unit 16 is provided on a central portion of the front cover 12 between the left and right headlight units.

In the present embodiment, the detection unit 16 is provided rearward of a cowl member. Due to the presence of the cowl member, the detection unit 16 is inconspicuous in a front view of the vehicle 1, which prevents the external appearance of the vehicle 1 from being poor. The cowl member is made of a material that allows electromagnetic waves to pass therethrough, such as resin.

The detection unit 16 is provided on the central portion of the front cover 12, and thus the detection unit 16 can acquire a wider detection range expanding to the left and the right in front of the vehicle 1, and can detect what is in front of the vehicle 1 with fewer misses. Also, the single detection unit 16 makes it possible to equally monitor the left and the right forward of the vehicle 1. Therefore, such a configuration is particularly advantageous when only one detection unit 16 is provided instead of a plurality of detection units 16.

The detection unit 17 is a camera that captures an image of what is in front thereof. The detection unit 17 may also be referred to as a camera 17. A portion of the cowl member located forward of the camera 17 is provided with an opening, or the portion located forward of the camera 17 is made of a transparent member. The camera 17 captures an image of what is in front thereof through the opening or the transparent member.

Next, a control unit 100 will be described. The vehicle 1 is provided with the control unit 100, and the control unit 100 includes a plurality of ECUs 110 to 160 that are connected via an in-vehicle network so as to be able to communicate with each other. Each ECU includes, for example, a processor, which is typically a CPU, a storage device such as a semiconductor memory, and an interface with an external device. The storage device stores, for example, a program that is executed by the processor, and data that is used by the processor to perform processing. Each ECU may include, for example, a plurality of processors, a plurality of storage devices, and/or a plurality of interfaces.

The following describes the functions and the like of the ECUs 110 to 160. Note that the number of ECUs and the functions of the ECUs may be appropriately designed for the vehicle 1, and may be subdivided or integrated compared to those in the present embodiment.

The ECU 110 performs control related to automated driving, specifically adaptive cruise control (referred to as ACC) of the vehicle 1. In the ACC according to the present embodiment, acceleration and deceleration of the vehicle 1 are automatically controlled. In the example of control described below, the speed, and acceleration and deceleration of the vehicle are controlled so that the vehicle follows the preceding vehicle detected by the detection unit 16 (radar 16) and/or the detection unit 17 (camera 17), maintaining a set interval therebetween. The ECU 110 realizes ACC by cooperating with another ECU such as an ECU. Note that, in this example, upon a manual braking operation being performed, ACC is cancelled and a non-ACC manual operation is resumed.

The ECU 120 controls the detection units 16 and 17, which detects circumstances around the vehicle 1, particularly a target in front of the vehicle 1, and perform information processing on the results of detection. A target that can be detected in front of the vehicle is mainly the preceding vehicle, and information regarding the preceding vehicle, particularly information that includes the direction and the distance therefor relative to the vehicle 1, is referred to as preceding vehicle information. The detection units 16 and 17 for acquiring such pieces of preceding vehicle information and the ECU 120 that controls the detection units 16 and 17 may also be collectively referred to as detection units, forward monitoring devices, or forward monitoring units. The detection unit 17 is a camera that captures an image of what is in front of the vehicle 1. In the present embodiment, the detection unit 17 is provided above the detection unit 16 inside the cowl member of the vehicle 1. By analyzing the image captured by the camera 17, it is possible to extract the contour of the target, for example. Furthermore, by analyzing the characteristics of the detected contour, it is also possible to specify the type of the detected vehicle. Types of vehicles include a two-wheeled vehicle and a four-wheeled vehicle, for example. Furthermore, regarding a four-wheeled vehicle, it is possible to detect the size thereof based on the distance detected by the radar 16, and specify the vehicle as an ordinary vehicle or a large-sized vehicle, for example.

In addition to the function of the forward monitoring unit, the ECU 120 performs processing on a signal detected by a gyro sensor 30 to specify the inclination of the vehicle body. The gyro sensor 30 is preferably located at the center of gravity of the vehicle body, and detects at least an inclination about a pitching axis and an inclination about a rolling axis. The rolling axis is an axis that extends in a travel direction of the vehicle, and the pitching axis is an axis that extends in the direction of the width of the vehicle body and is orthogonal to the rolling axis. Note that when a device such as the engine (i.e. the power source) or an accessory is located at the center of gravity, the gyro sensor 30 need only be located at a position near the center of gravity of the vehicle body from among positions at which the gyro sensor 30 can be located, for example, and is preferably located at the position that is nearest to the center of gravity. Practically, the gyro sensor 30 may be located near the center of gravity, such as at a position above the power source.

The detection unit 16 is a millimeter wave radar, for example, and detects a target around the vehicle 1 to measure the direction of, and the distance to, the target. In the present embodiment, one radar 16 is provided so as to face forward, but may be provided so as to face in another direction. The radar 16 scans a predetermined range expanding in the vehicle width direction in front of the vehicle to detect a target in the scan range. The scan range is roughly a fan-shaped range where the radar 16 is located at the corner thereof. The ECU 120 controls the camera 17 and the radar 16 and performs information processing on the results of detection, for example.

The ECU 130 controls the power unit 2. The power unit 2 is a mechanism that outputs a driving force to rotate the driven wheel of the vehicle 1, and includes the engine 21 and the transmission 22, for example. The ECU 130 controls the output of the engine 21 according to the driver's driving operation (an acceleration operation or a speed-up operation) detected by an operation detection sensor 8*a* of an accelerator grip provided at the handlebars 8, for example. When the driving state of the vehicle 1 is ACC (automated driving), the ECU 130 automatically controls the power unit 2 according to an instruction from the ECU 110, to control the speed and acceleration and deceleration of the vehicle 1. Furthermore, in the ACC mode, the ECU 130 may switch the gear stage of the transmission 22 based on information such as the vehicle speed detected by a vehicle speed sensor 7*c*.

The ECU 140 controls brake devices 10. The brakes 10 are disc brake devices, for example, and are respectively provided for the wheels of the vehicle 1, and decelerate or stop the vehicle 1 by resisting the rotation of the wheels. The ECU 140 controls the action of the brake device 10 according to the driver's driving operation (braking operation) detected by an operation detection sensor 7*b* provided on a brake pedal. When the vehicle 1 is in an ACC driving state, the ECU 140 automatically controls the brake device 10 according to an instruction from the ECU 110 to control the deceleration and stopping of the vehicle 1. The brake device 10 may also perform an action to keep the vehicle 1 in a stopped state.

The ECU 150 controls an input device 153 and an output device that includes a voice output device 151 and a display unit 152. The input device 153 receives information input from the driver. In the example in FIG. 1, the input device 153 includes a selection and enter key (also referred to as a cross key) 152*a* and an ACC instruction button 153*b*. The voice output device 151 is a voice output device, and notifies the driver of information by voice. Note that, in a case of two-wheeled vehicle, it is difficult to hear voice. Therefore, an image display device may be employed instead. The display unit 152 notifies the driver of information by displaying an image. The display unit 152 is provided in the meter panel MP, and is particularly used to determine and display the tracking target and in the ACC mode in this example. The input device 153 is preferably a set of switches that is located such that the driver can operate the switches while holding the handlebars, and is used to input an instruction to the vehicle 1. It is possible to turn the ACC mode ON and OFF by pressing the button 153*b*. For example, if the button 153*b* is pressed in a non-ACC mode (a manual driving mode), the mode is switched to the ACC mode, and if the button 153*b* is pressed in the ACC mode, the mode is switched to the non-ACC mode. In the ACC mode, the vehicle 1 follows the preceding vehicle captured by the radar 16. Not that the display unit 152 is not necessarily provided in the meter panel MP, and may be provided in a head-up display, a windscreen mirror, or a visor, for example.

The ECU 160 controls communication performed by a communication device 160*a*. This communication may be communication with a server device performed to acquire map information from a navigation device (not shown), and reception of signals from a satellite using a GPS antenna, for example. Note that the control configuration shown in FIG. 1 is an example, and the targets to be controlled by one ECU may be further subdivided, or, conversely, integrated. In addition, other parts such as lights may be included in the targets of automatic control.

Tracking Travel in ACC Mode

Figure 2:
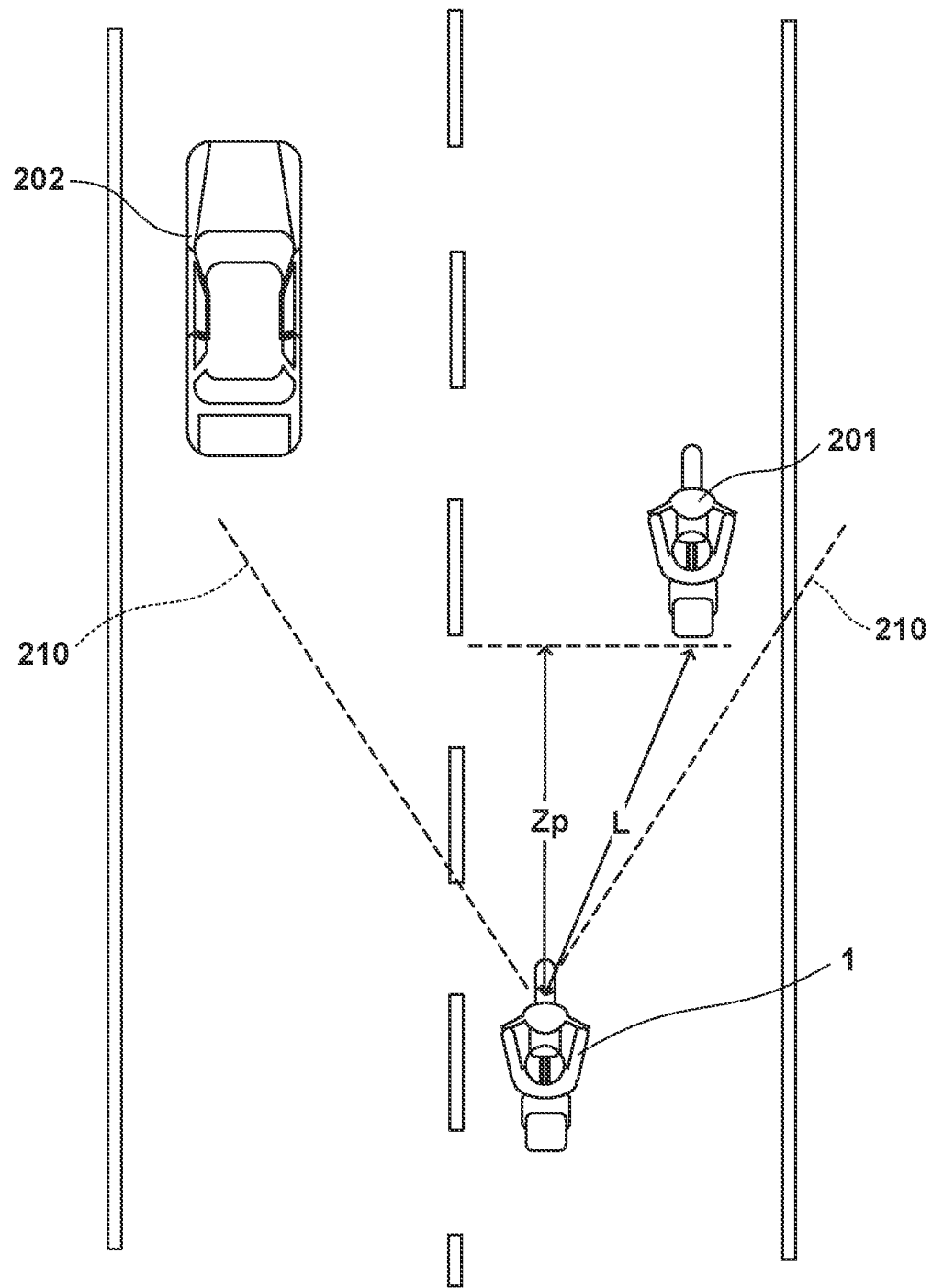
FIG. 2 is a diagram showing an example of a situation in which the embodiment is adopted.

Next, tracking travel performed by the vehicle 1 in the ACC mode will be described. FIG. 2 shows an example of such a situation seen from above. The vehicle 1 is a two-wheeled vehicle that can travel in ACC, and a vehicle 202 is a four-wheeled vehicle that is travelling in the lane next to the vehicle 1. A vehicle 201 is a two-wheeled vehicle that is travelling in the same lane as the vehicle 1. The vehicle 1 is provided with the radar 16 that detects a target in front of the vehicle 1, and a detectable range of the radar 16 is a scan range 210. Although the radar 16 has a limitation regarding a detectable distance, such a limitation is not specifically shown in FIG. 2.

In the situation shown in FIG. 2, both the vehicle 201 and the vehicle 202 are present in the scan range of the radar 16. When the vehicle 1 performs tracking travel in the ACC mode, the vehicle 1 may follow a selected vehicle or a vehicle located at a position that has been specified in advance, as a tracking target vehicle. For the vehicle set as the tracking target, the ECU 110 of the vehicle 1 maintains the speed or performs acceleration or deceleration control as necessary in order to keep the distance to the tracking target vehicle at a constant distance that is, for example, the distance at the time an ACC instruction was made. The distance to be kept here may be a distance L between the vehicles. However, in this example, the distance is set to a distance Zp in the travel direction. Even when the direction of the tracking target vehicle slightly changes, if the vehicle can be identified as the same vehicle, the vehicle 1 continues following the vehicle. However, if the tracking target vehicle deviates from the scan range 210, or the vehicle suddenly changes its position so that the vehicle cannot be identified as the same vehicle, the vehicle 1 stops performing tracking travel. At this time, it is dangerous, especially on highways, that the throttle is rapidly closed and the vehicle 1 is suddenly decelerated due to the lost (missing) of the tracking target. Therefore, in order to avoid sudden deceleration even in such a case, it is preferable to notify the driver of the lost and perform moderate deceleration or maintain the speed unless the approaching target is detected forward.

Specification of Target by Radar

Figure 3:
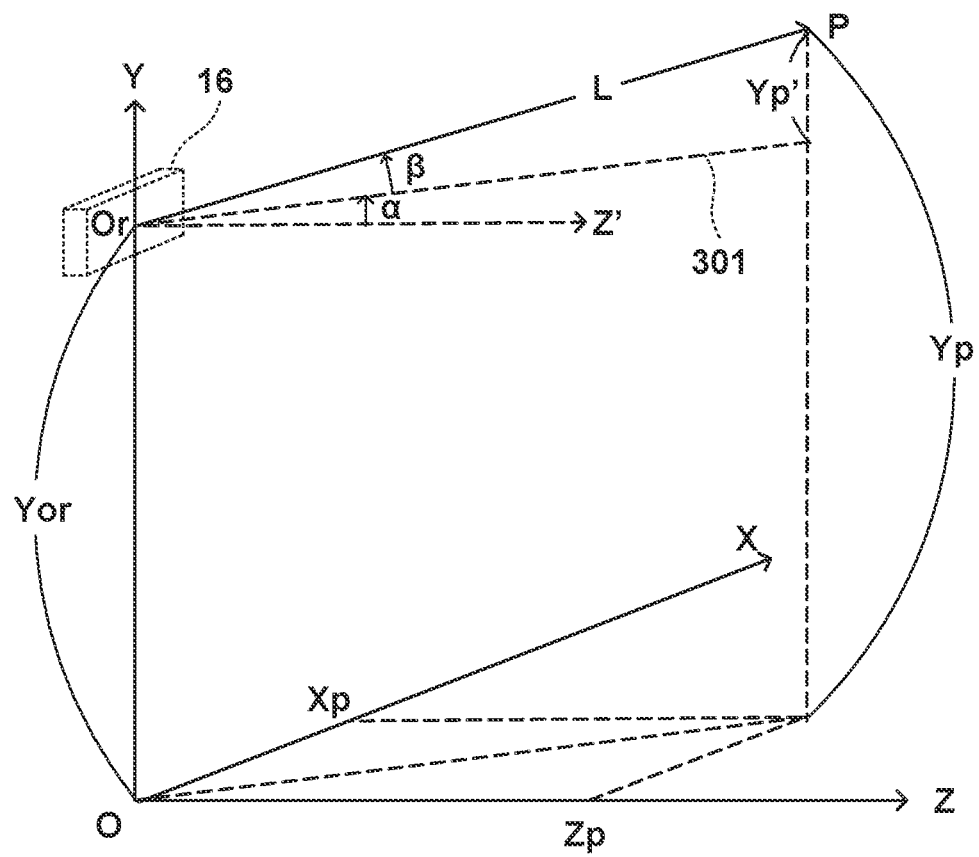
FIG. 3 is a diagram illustrating an example of a coordinate space of a radar.

First, an example of a coordinate system for specifying the position of the target captured by the radar will be described with reference to FIG. 3. In FIG. 3, an origin O is the origin of a space that specify the position of the target captured by the radar 16 (and the camera 17), and may specifically be an intersection of a downward vertical line from a central portion of the radar 16 and the ground when the vehicle 1 stands upright. The Y axis is an axis that connects the origin O and a center point Or of the radar 16 (referred to as a radar origin) when the two-wheeled vehicle stands upright, and corresponds to a height component. The position of the center point of the radar 16 is indicated by Yor. That is to say, Yor is the height of the radar 16 from the ground when the two-wheeled vehicle stands upright. That is to say, Yor is an axis that extends from the origin O to the center line of the scan range in the vehicle width direction of the radar 16 when the two-wheeled vehicle stands upright. The Z axis is an axis that is parallel with an axis of the vehicle extending from the origin O in the front-rear direction, and indicates a component in the depth direction seen from the driver. The X axis is orthogonal to the Y axis and the Z axis, and indicates a component in the vehicle width direction.

In this example, the radar 16 emits a radio wave (beam) in a certain direction, and detects the distance to the target based on the reflection thereof. The direction is represented by an azimuth angle $\alpha$ and an elevation angle $\beta$. An axis that passes through the radar origin Or and is parallel with the Z axis is denoted as Z' axis, and an axis that passes through the radar origin Or and is parallel with the X axis is denoted as X axis (not shown). The azimuth angle $\alpha$ is the angle formed by a projection line 301 when the radio wave beam is projected so as to be orthogonal to the X'-Z' plane, and the Z' axis. The elevation angle $\beta$ is the angle formed by the projection line 301 and the radio wave beam.

For example, a target at a position P is detected by the radar 16 and the position is specified as (distance L, azimuth angle $\alpha$, elevation angle $\beta$). In such a case, the position can be transformed to rectangular coordinates (Xp, Yp', Zp) with respect to the radar origin Or, using the following equations.

$Xp = L \cdot \cos\beta \cdot \sin\alpha$ $Yp' = L \cdot \sin\beta \cdot \sin\alpha$ $Zp = L \cdot \cos\beta \cdot \cos\alpha$ By adding the height Yor of the radar 16 to the Y component, the coordinates can be transformed to three-dimensional rectangular coordinates (Xp, Yp, Zp) with respect to the origin O that is a point immediately below the radar 16 of the two-wheeled vehicle that stands upright, i.e. a point near the grounding point of the front wheel of the two-wheeled vehicle.

$Xp = L \cdot \cos\beta \cdot \sin\alpha$ $Yp = L \cdot \sin\beta \cdot \sin\alpha + Yor$ $Zp = L \cdot \cos\beta \cdot \cos\alpha$ The position of the target detected by the radar 16 is specified in such a three-dimensional space with reference to the vehicle 1, and the specified position is stored as a detected position. The radar 16 scans the scan range in front thereof while changing the azimuth angle $\alpha$ and the elevation angle $\beta$, and the position of the detected target is updated upon the scanning. Note that scanning need not necessarily be performed in the elevation angle direction, and may be performed only in the azimuth angle direction. Conversely, by widening the scan range in the elevation angle direction, what is in front of the vehicle 1 is more likely to be included in the detection range even when the vehicle 1 is inclined forward or rearward.

Figure 4:
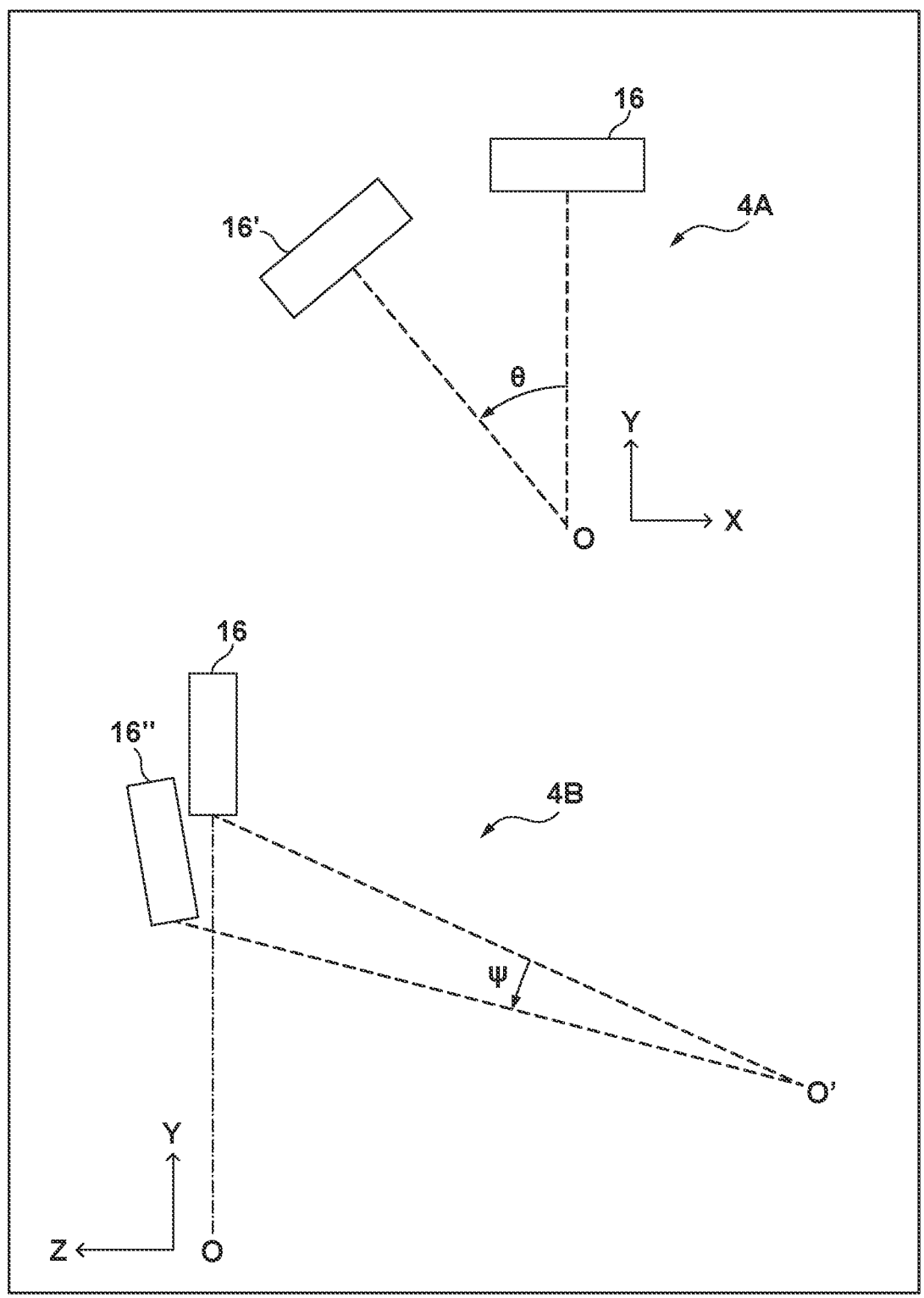
FIG. 4 is a diagram showing how a detected position is corrected according to a roll angle and a pitch angle of a vehicle body.

As described above, the position of the target specified by the radar 16 is a relative position with respect to the vehicle 1. Since the relative position is specified, it is easy to perform control in ACC for following the preceding vehicle because it is only necessary to keep the relative position constant. On the other hand, due to changes in orientation such as an inclination in the left-right direction (rolling or a rolling action) and an inclination in the front-rear direction (pitching or a pitching action), which are characteristics of two-wheeled vehicles, the coordinate space is also inclined with the vehicle body, and the position of the preceding vehicle is rapidly displaced. FIG. 4 illustrates an inclination in the left-right direction and an inclination in the front-rear direction. In FIG. 4, an example 4A is a diagram focusing on the radar 16 in a front view of the vehicle 1. The origin O is the grounding point of the front wheel FW, and the radar 16 is inclined to a radar 16' by pivoting about the origin O by an angle $\theta$ (referred to as roll angle). An example 4B shows the vehicle 1 seen from the left side. In this case, the radar 16 is inclined to a radar 16" by pivoting about an origin O' of the vehicle 1, instead of the origin O of the coordinate space, by an angle $\psi$ (referred to as a pitch angle). Of course, each inclination occurs not only in one direction, but also in the opposite direction to the direction shown in the figure.

Correction of Positional Coordinates of Target

Therefore, in the present embodiment, the coordinates of the target detected by the radar 16 is corrected so as to be returned by a roll angle of $\theta$ and a pitch angle of $\psi$. FIG. 5 shows an example of processing performed to correct the coordinates of the target detected by the radar 16 (referred to as radar coordinates). This procedure is performed by the ECU 120, for example. However, this procedure may be performed by another ECU such as the ECU 110. First, the ECU 120 detects the current inclination of the vehicle body using the gyro sensor 30 (501). The detected inclination includes at least a roll angle and a pitch angle. Next, the ECU 120 detects the target using a sensor, i.e. the radar 16, and detects the coordinates thereof (S503). The coordinates detected at this point may be polar coordinates or rectangular coordinates. Polar coordinates are transformed to rectangular coordinates as described above in this example. Also, in the case of rectangular coordinates, the origin of the coordinates is transformed so as to be translated to the origin O as shown in FIG. 3 and so on as necessary. Next, the ECU 120 corrects the coordinates of the target detected by the radar 16 (S505). Finally, the ECU 120 updates the positional information regarding the target with the corrected coordinates (S507), and terminates processing.

Here, the correction processing in step S505 will be described. As described with reference to FIG. 4, the roll angle θ and the pitch angle ψ are angles with respect to different rotation axes. Therefore, in a strict sense, it is necessary to perform correction in consideration of the rotation axes. However, the distance that the radar 16 moves due to pitching is sufficiently smaller than the distance measured by the radar 16. Therefore, it can be considered that the accuracy will not significantly degrade even if a displacement resulting from the pitch angle ψ is corrected about the origin O. Therefore, such simplified correction will be described in this example.

Correction of the roll angle θ is rotation transformation performed to return the angle by the roll angle θ. Therefore, when the coordinates before correction are denoted as (X, Y, Z) and the coordinates after correction are denoted as (X', Y', Z'), correction can be performed using Equations 1.

$$X'=X\cdot\cos(-\theta)-Y\cdot\sin(-\theta)$$

$$Y'=X\cdot\sin(-\theta)+Y\cdot\cos(-\theta)$$

$$Z'=Z \qquad \text{Equations 1}$$

According to a simple method, correction of the pitch angle ψ is also rotation transformation performed to return the angle by the pitch angle ψ. Therefore, when the coordinates before correction are denoted as (X', Y', Z') and the coordinates are denoted as (X'', Y'', Z''), correction can be performed using Equations 2.

$$X''=X'$$

$$Y''=Y'\cdot\sin(-\psi)+Y'\cdot\cos(-\psi)$$

$$Z''=Z'\cdot\cos(-\psi)-Z'\cdot\sin(-\psi) \qquad \text{Equations 2}$$

These equations can be combined into Equations 3.

$$X''=X\cdot\cos(-\theta)-Y\cdot\sin(-\theta)$$

$$Y''=(X\cdot\sin(-\theta)+Y\cdot\cos(-\theta))\cdot\sin(-\psi)+(X\cdot\sin(-\theta)+Y\cdot\cos(-\theta))\cdot\cos(-\psi)$$

$$Z''=Z\cdot\cos(-\psi)-Z\cdot\sin(-\psi) \qquad \text{Equations 3}$$

The coordinates (X'', Y'', Z'') thus obtained are the coordinates after correction. Although linear equations for transforming the respective coordinate are shown in this example, of course, transformation may be performed using a two-step matrix for correcting the inclination angles.

If the pitch angle ψ is to be strictly corrected, (X'', Y'', Z'') are calculated from (X', Y', Z') so as to correct the pitch angle ψ about the center of gravity O' (see the example 4B in FIG. 4) seen from the side of the vehicle 1, assuming that the center of gravity O' is the center of pitching rotation. For example, the origin O is translated to O' rotation correction is performed with respect to the origin, and the origin O' is translated back to the origin O. Note that translation can be realized using affine transformation, and therefore this correction can also be realized using a two-step matrix for correcting the roll angle θ and the pitch angle ψ.

The roll angle and the pitch angle can be corrected as described above. As a result, it is possible to prevent the position of the target detected by the radar, especially the preceding vehicle, from changing rapidly due to the rolling or pitching of the vehicle 1, and avoid losing (missing) the tracking target due to changes in the orientation of the vehicle 1.

The position of the preceding vehicle thus corrected is updated at predetermined time intervals, e.g. time intervals in the range of several tens of milliseconds to 100 milliseconds. The identity of the object is determined based on the closeness and predicted movement of the detected position at each update, or an image captured by the camera 17, the preceding tracking target vehicle is identified, and the position thereof is specified. Considering the specified preceding vehicle as the tracking target, the ECU 110, for example, controls the accelerator, brake, and so on, and thus it is possible to travel while keeping the distance to the preceding tracking target vehicle at a preset value. The distance may be set to, for example, the distance to the tracking target when the tracking target is selected and an instruction to start ACC is made. Also, if the tracking target detected by the radar 16 is lost during tracking travel, ACC is cancelled at that point. In this way, the position of the tracking target detected by the radar 16 is corrected according to the orientation of the vehicle 1, and ACC is performed based on the corrected position, and thus more accurate and continuous tracking travel can be performed.

Other Embodiments

Although both the roll angle and the pitch angle are corrected in the above embodiment, only one of them may be corrected. In such a case, the roll angle may be the same as in the above embodiment. On the other hand, the pitch inclination may be corrected by replacing X', Y', and Z' on the right side of Equations 2 used to obtain the corrected coordinates (X'', Y'', Z'') with X, Y, and Z, respectively.

Furthermore, although a positional change in the left-right direction (the angle of this change is referred to as a yaw angle, and a motion that causes this change is referred to as yawing or a yaw action) is left unchanged in the above embodiment, such a change may be corrected. As shown in FIG. 1, in the present embodiment, the radar 16 is provided on a member that is extended forward from the main frames, and the position thereof is fixed relative to the main frames. However, in the case of a vehicle type without a front cover, the radar 16 may be provided on the handlebars, and the orientation of the radar may be changed upon the handlebars being operated. In such a case, the orientation of the vehicle 1 and the orientation of the handlebars are different, and therefore the displacement of the position detected by the radar 16 resulting from such an operation with the handlebars may be corrected.

In such a case, the difference between the direction in which the main frames face and the direction in which the handlebars face is to be corrected as the yaw angle. In this case, the state where the steering axis of the handlebars is directed straight ahead is used as a reference (the yaw angle is 0 degree), and the rotation angle of the steering axis with respect to the head pipe fixed to the frames is detected as the yaw angle. Therefore, a detection unit (e.g. a rotary encoder) for this purpose is provided near the steering axis. The yaw angle is corrected on the X-Z plane in the coordinate space in FIG. 3 when the vehicle in FIG. 1 is viewed from above, for example. Since the head pipe is slightly inclined rearward, the inclination caused by the operation with the handlebars includes not only a yaw component but also a certain amount of roll component. However, only the yaw angle that is the main component is considered in this example. Also, although the steering axis and the origin O are slightly displaced from each other, such a displacement is sufficiently small relative to the detection distance of the radar 16. Therefore, the yaw angle is also corrected by rotation transformation about the origin O in FIG. 3.

Therefore, if only the yaw angle is to be corrected, coordinates are calculated using Equations 4 as shown below, where the coordinates detected by the radar 16 are (X, Y, Z), the corrected coordinates are (X''', Y''', Z'''), and the yaw angle is φ.

$$X''' = X \cdot \cos(-\varphi) - Z \cdot \sin(-<\varphi)$$

$$Y''' = Y$$

$$Z''' = X \cdot \sin(-\varphi) + Z \cdot \cos(-\varphi) \quad \text{Equations 4}$$

By applying (X'', Y'', Z'') in Equations 3 to X, Y, and Z in Equations 4, it is possible to obtain coordinates in which the yaw angle (the steering angle of the handlebars) is also corrected in addition to the pitch angle and the roll angle (Equations 5).

$$X''' = (X \cdot \cos(-\theta) - Y \cdot \sin(-\theta)) \cdot \cos(-\varphi) - (Z \cdot \cos(-\psi) - Z \cdot \sin(-\psi)) \cdot \sin(-\varphi)$$

$$Y''' = (X \cdot \sin(-\theta) + Y \cdot \cos(-\theta)) \cdot \sin(-) + (X \cdot \sin(-) + Y \cdot \cos(-\theta)) \cdot \cos(-\psi)$$

$$Z''' = (X \cdot \cos(-\theta) - Y \cdot \sin(-)) \cdot \sin(-\varphi) + (Z \cdot \cos(-\psi) - Z - \sin(\cdot \psi)) \cdot \cos(-\varphi) \quad \text{Equations 5}$$

These Equations 5 can also be realized using three-step matrix transformation. Furthermore, it is possible to correct a desired state change in the roll angle, the pitch angle, or the yaw angle by combining these equations.

In this embodiment, the coordinate system for the position detected by the radar is a rectangular coordinate system. However, a polar coordinate system that specifies the position by the distance, the azimuth angle, and the elevation angle of an object may be used. In such a case, a displacement caused by the pitch angle and the yaw angle can be corrected by removing the pitch angle from the elevation angle and the yaw angle from the azimuth angle. A displacement caused by the roll angle affect both the elevation angle and the azimuth angle. Therefore, the simplest way is to once transform the polar coordinate system to a rectangular coordinate system, rotationally transform the rectangular coordinate system so as to remove the roll angle, and then return the rectangular coordinate system to the polar coordinate system again.

As described above, Equations 5 and so on are simple equations that allow the rotation centers of the pitch angle and the yaw angle and the center of rotation transformation for correction to be displaced from each other. To achieve higher accuracy, for each transformation, the displacement from the actual rotation axis may be adjusted by performing translation transformation when performing rotation transformation for correction. Such simple expressions are used because the distance to the target detected by the radar 16 is large and thus the displacement caused by a change in the orientation of the radar 16 is particularly large, whereas the displacement of the radar position is sufficiently small when compared thereto.

The above embodiment and modification can be summarized as follows.

(1) A first aspect of the present invention provides an object detection system for a saddle-type vehicle, characterized by including:
  object detection means for detecting an object;
  inclination detection means for detecting an inclination of a saddle-type vehicle; and
  position specification means for specifying a position of the object detected by the object detection means, and correcting the position so that the inclination detected by the inclination detection means is upright.

With this configuration, it is possible to accurately detect the position of another vehicle by performing rotational coordinate transformation, using positional coordinates, without using a separate module.

(2) A second aspect of the present invention provides the object detection system for a saddle-type vehicle according to (1), characterized in that
  the inclination detected by the inclination detection means is an inclination caused by at least one of a rolling action, a pitching action, and a yaw action of the saddle-type vehicle.

With this configuration, it is possible to accurately detect the position of another vehicle by performing rotational coordinate transformation on at least one of the rolling action and the pitching action, using the positional coordinates, without using a separate module.

(3) A third aspect of the present invention provides the object detection system for a saddle-type vehicle according to (1) or (2), characterized in that
  the inclination detection means is a gyro sensor provided above a power source of the saddle-type vehicle when viewed from a side of the vehicle.

With this configuration in which the inclination detection means is a gyro sensor provided at the center of gravity of the vehicle, it is possible to detect the inclination of the entire vehicle more easily.

(4) A fourth aspect of the present invention provides the object detection system for a saddle-type vehicle according to any one of (1) to (3), characterized in that
  the object detection means is provided at a front position of the saddle-type vehicle, and detects an object in front of the saddle-type vehicle.

With this configuration in which the object detection means is provided at a front position of the vehicle, it is possible to more easily obtain information regarding what is in front of the vehicle, and improve object recognition.

(5) A fifth aspect of the present invention provides the object detection system for a saddle-type vehicle according to any one of (1) to (4), characterized in that
  the object detection means is at least one of a radar, a sonar, and a camera.

With this configuration, it is possible to correct the detected position of an object recognized by a radar, a sonar, or a camera, according to actions of the vehicle body.

(6) A sixth aspect of the present invention provides a saddle-type vehicle characterized by being equipped with the object detection system for a saddle-type vehicle according to any one of (1) to (5).

With this configuration, it is possible to correct a displacement in the detected position caused by actions of the vehicle body, and more accurately track the selected tracking target.

(7) A seventh aspect of the present invention provides a position correction method performed by an object detection system for a saddle-type vehicle, characterized by:
  detecting an object by using object detection means;
  detecting an inclination of a saddle-type vehicle by using inclination detection means; and
  specifying a position of the object detected by the object detection means, and correcting the position so that the inclination detected by the inclination detection means is upright.

With this configuration, it is possible to accurately detect the position of another vehicle by performing rotational coordinate transformation using positional coordinates, without using a separate module.

The present invention is not limited to the above embodiments and various changes and modifications can be made within the spirit and scope of the present invention. Therefore, to apprise the public of the scope of the present invention, the following claims are made.

The invention claimed is:

1. An object detection system for a saddle-type vehicle, comprising: an object detection unit configured to detect an object, wherein the object detection unit is provided on a handlebar which is rotatable to a body of the saddle-type vehicle; an inclination detection unit configured to detect an inclination of a saddle-type vehicle; a steering angle detection unit configured to detect a steering angle of the handlebar to the body; and a position specification unit configure to specify a position of the object detected by the object detection unit, and correcting the position so that the inclination detected by the inclination detection unit is upright and the steering angle of the handlebar detected by the steering angle detection unit is directed straight.

2. The object detection system for a saddle-type vehicle according to claim 1, wherein
the inclination detected by the inclination detection unit is an inclination caused by at least one of a rolling action, a pitching action, and a yaw action of the saddle-type vehicle.

3. The object detection system for a saddle-type vehicle according to claim 1, wherein the inclination detection unit is a gyro sensor provided above a power source of the saddle-type vehicle when viewed from a side of the saddle-type vehicle.

4. The object detection system for a saddle-type vehicle according to claim 1, wherein
the object detection unit is provided at a front position of the saddle-type vehicle, and detects an object in front of the saddle-type vehicle.

5. The object detection system for a saddle-type vehicle according to claim 1, wherein
the object detection unit is at least one of a radar, a sonar, and a camera.

6. A saddle-type vehicle equipped with an object detection system for the saddle-type vehicle, the object detection system for the saddle-type vehicle, comprising: an object detection unit configured to detect an object, wherein the object detection unit is provided on a handlebar which is rotatable to a body of the saddle-type vehicle; an inclination detection unit configured to detect an inclination of the saddle-type vehicle; a steering angle detection unit configured to detect a steering angle of the handlebar to the body; and a position specification unit configure to specify a position of the object detected by the object detection unit, and correcting the position so that the inclination detected by the inclination detection unit is upright and the steering angle of the handlebar detected by the steering angle detection unit is directed straight.

7. A saddle-type vehicle equipped with the object detection system for a saddle-type vehicle, the object detection system for a saddle-type vehicle, comprising: an object detection unit configured to detect an object, wherein the object detection unit is provided on a handlebar which is rotatable to a body of the saddle-type vehicle; an inclination detection unit configured to detect an inclination of the saddle-type vehicle; a steering angle detection unit configured to detect a steering angle of the handlebar to the body; and a position specification unit configure to specify a position of the object detected by the object detection unit, and correcting the position so that the inclination detected by the inclination detection unit is upright and the steering angle of the handlebar detected by the steering angle detection unit is directed straight.

\* \* \* \* \*